(12) United States Patent
Hanna et al.

(10) Patent No.: US 8,195,044 B2
(45) Date of Patent: Jun. 5, 2012

(54) BIOMETRIC CAMERA MOUNT SYSTEM

(75) Inventors: Keith J. Hanna, New York, NY (US);
George Herbert Needham Riddle, Princeton, NJ (US)

(73) Assignee: Eyelock Inc., Cagaus, PR (US)

( * ) Notice: Subject to any disclaimer, the term of this patent is extended or adjusted under 35 U.S.C. 154(b) by 0 days.

(21) Appl. No.: 12/749,663

(22) Filed: Mar. 30, 2010

(65) Prior Publication Data

US 2010/0253816 A1    Oct. 7, 2010

Related U.S. Application Data

(60) Provisional application No. 61/164,528, filed on Mar. 30, 2009.

(51) Int. Cl.
*G03B 35/00* (2006.01)

(52) U.S. Cl. ......................................................... 396/329

(58) Field of Classification Search .................. 396/322, 396/325, 329.419, 427, 428; 348/36, 38, 348/47, 48, 373–374, 375–376; 340/3.1, 340/5.53
See application file for complete search history.

(56) References Cited

U.S. PATENT DOCUMENTS

| 7,298,969 B2 * | 11/2007 | Elberbaum ..................... 396/28 |
| 2007/0122011 A1 * | 5/2007 | Takizawa ..................... 382/118 |

* cited by examiner

*Primary Examiner* — W. B. Perkey
*Assistant Examiner* — Minh Phan
(74) *Attorney, Agent, or Firm* — Foley & Lardner LLP; John D. Lanza

(57) ABSTRACT

A system for reducing the substantially vertical extent of a wide-area biometric system and for reducing the cost and complexity of installation while maintaining high biometric performance, using a substantially horizontally configuration of cameras, preferably with an attention mechanism, and using a precision calibration system that can be used by an unskilled technician and that does not require an accurate site survey or additional materials or equipment.

9 Claims, 5 Drawing Sheets

BIOMETRIC CAMERA MOUNT SYSTEM

CROSS-REFERENCE TO RELATED APPLICATIONS

This application claims benefit from provisional application 61/164528 filed Mar. 30, 2009, which is hereby incorporated by reference in its entirety.

BACKGROUND OF THE INVENTION

Biometrics is the science and technology of measuring and analyzing biological data, such as the imagery of the face or iris. There are 3 problems that need to be overcome with the acquisition of biometric data: (i) ensuring that the biological data is within the field of coverage of one or more of the biometric sensors which is often difficult to control precisely since the sensors may be mounted in different ways for different deployments, and (ii) ensuring that the data is acquired as uniformly as possible so that comparison of data from the same user across different time periods is facilitated, and (iii) ensuring that the user is looking in the vicinity of the camera systems used in any face or iris recognition system

SUMMARY OF THE INVENTION

The invention comprises three primary elements: (i) a camera configuration whereby two or more cameras are aligned substantially horizontally while the field of coverage is substantially vertical, in order to reduce vertical height of the biometric device, (ii) a pivot mechanism that allows the camera configuration to be moved in unison in order to provide the same vertical field of coverage given different deployment-specific height and angle constraints imposed on the mounting location of the biometric device, and (iii) an attention mechanism comprising a display showing video of a person walking towards the biometric device.

DETAILED DESCRIPTION OF THE INVENTION

Figure 1:
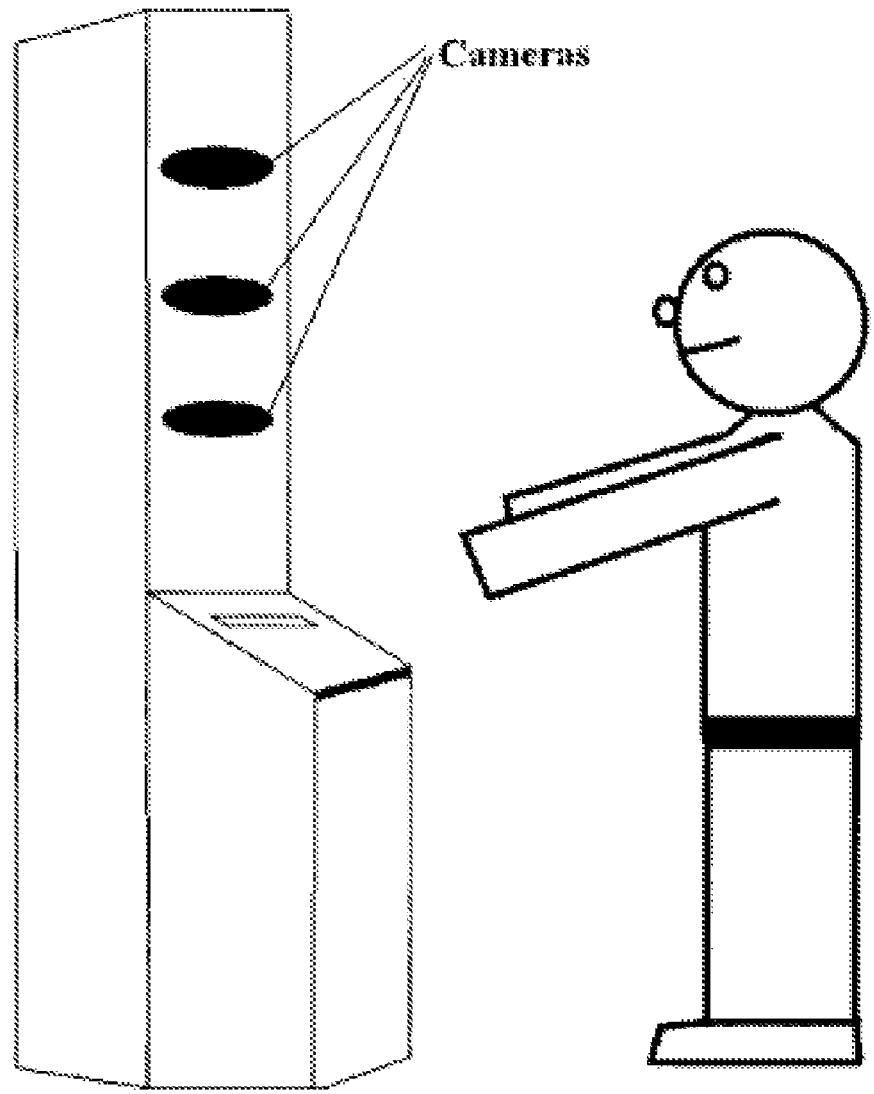
FIG. 1 shows prior art whereby multiple cameras are mounted in front of a user at a fixed angle and at a fixed height such that the face of the person is in the field of view of at least one of the cameras.

One existing approach to ensuring that the biological data is within the field of coverage is shown in FIG. 1 (prior art). In this system called Smart Gate (e.g. http://www.abc.net.au/science/news/stories/s1048494.htm), face imagery is acquired by one of 3 cameras mounted vertically in front of a user. The user is asked to stare straight forward at a kiosk, and the cameras are stacked vertically parallel to each other with a large vertical spacing so that the camera closest to the height of the user always captures a frontal view of the face. Ensuring a frontal view of the user facilitates comparison of the same user at a different time period, and improves overall system match performance.

Figure 2:
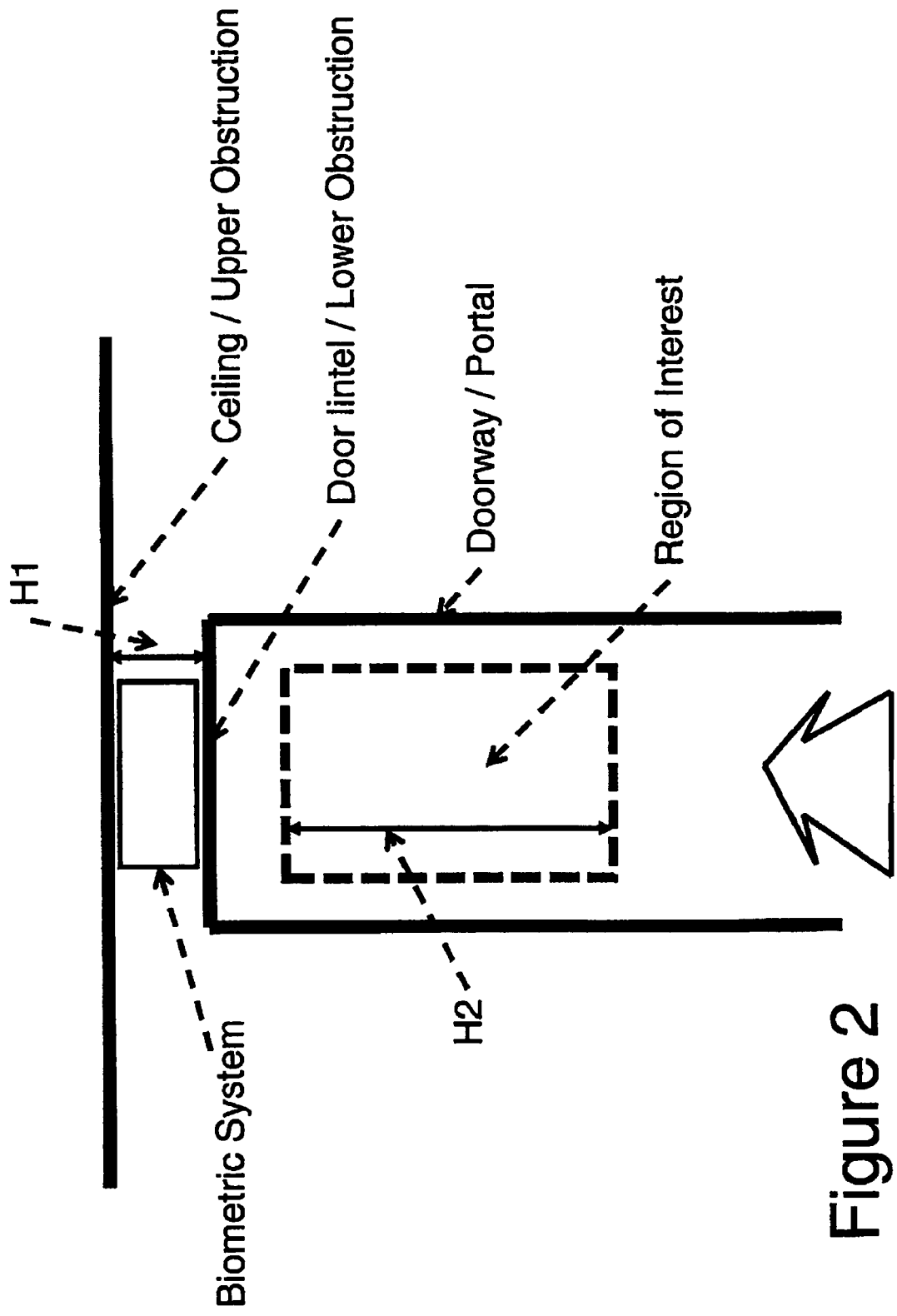
FIG. 2 shows a configuration where a biometric device is mounted above a doorway and covers a region of interest within the doorway.

FIG. 2 shows a different configuration for a biometric system. In this case, the biometric system has to be mounted between the top of a doorway and a ceiling (H1 in FIG. 2) which is typically 8-12". In general, the biometric system has to be mounted in a very small vertical space between a lower obstruction and a higher obstruction. Unfortunately, the vertical region of interest of the system, H2, is typically much larger than the vertical space H1 that is available to mount the biometric system. H2 is typically 24" or more. Even if H1 is greater than H2 such that the cameras in FIG. 1 could be raised above a doorway, then a problem still exists since if the user is asked to look straight ahead or at a fixed point, then a camera view will acquire a vertically skewed, perspective view of the person's face or iris, which makes matching the biometric data much more difficult.

Figure 3:
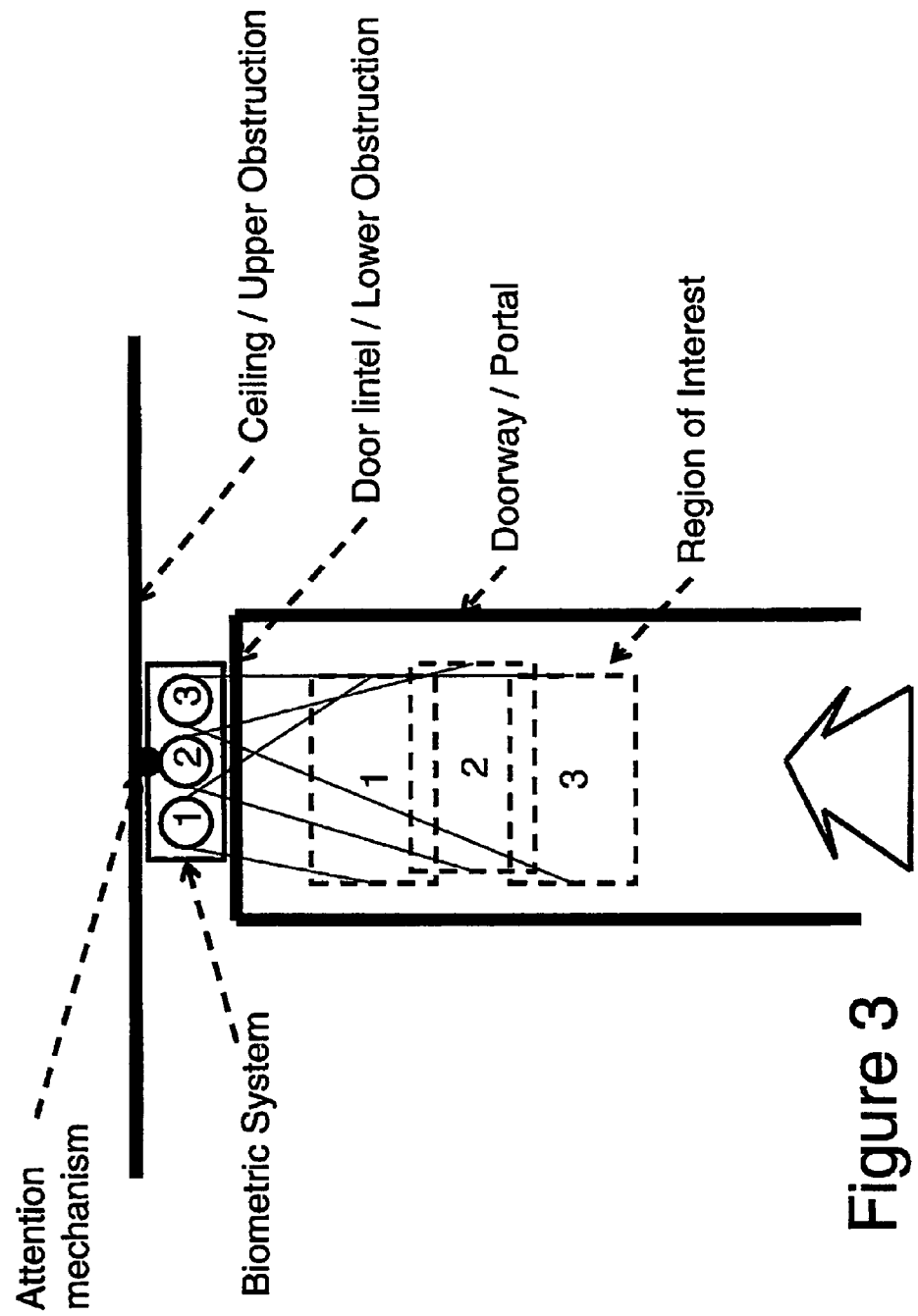
FIG. 3 shows a particular configuration of a biometric device mounted above a doorway comprising an attention mechanism, and three cameras mounted horizontally covering a vertical region of interest.

FIG. 3 shows how the problem has been addressed. First, the cameras are mounted horizontally in the gap H1 rather than vertically. Mounting the cameras horizontally reduces significantly the vertical space occupied, and each camera is tilted and panned carefully to cover a different vertical portion of the region of interest as shown in FIG. 3 by the number of the camera and the number of the region of interest. Second, the horizontal spacing between the cameras is minimized as much as physically possible. A preferred separation is 2" or 4". The approach of mounting the cameras horizontally saves vertical space, but it potentially introduces a new problem in that horizontally skewing of the imagery of the subject will occur, in addition to the vertical skewing discussed earlier which as discussed previously makes the matching of the biometric data much more difficult. By mounting the cameras with a close horizontal separation however minimizes the degree of horizontal skewing. Thirdly, an attention-mechanism, such as a video screen showing live video of the user as they use the system, is placed near the cameras. The user is then asked to look at the video screen. Users who are short and are at the bottom of the region of interest will have to look up at a greater tilt angle than users who are tall and are at the top of the region of interest. The benefit of this approach is that vertical skewing of the imagery introduced by the position of the cameras is cancelled out by the user tilting their head to the same vertical height as all the cameras.

Because the cameras are all at the same height, then the vertical skewing will be cancelled out equally in all camera views. If an attention mechanism at the camera cannot be applied due to the physical constraints of the system, then an alternative more complex solution to this third step is a fore shortening compensation algorithm to remove the vertical skewing.

While this discussion has focused on allowing a substantially vertical region of interest to be covered using a horizontal arrangement of cameras, alternatively the same method could be used such that a substantially horizontal region of interest is covered using a vertical arrangement of cameras. The cameras could also be pan/tilt/zoom cameras, either moved directly or by means of a mirror.

Figure 4:
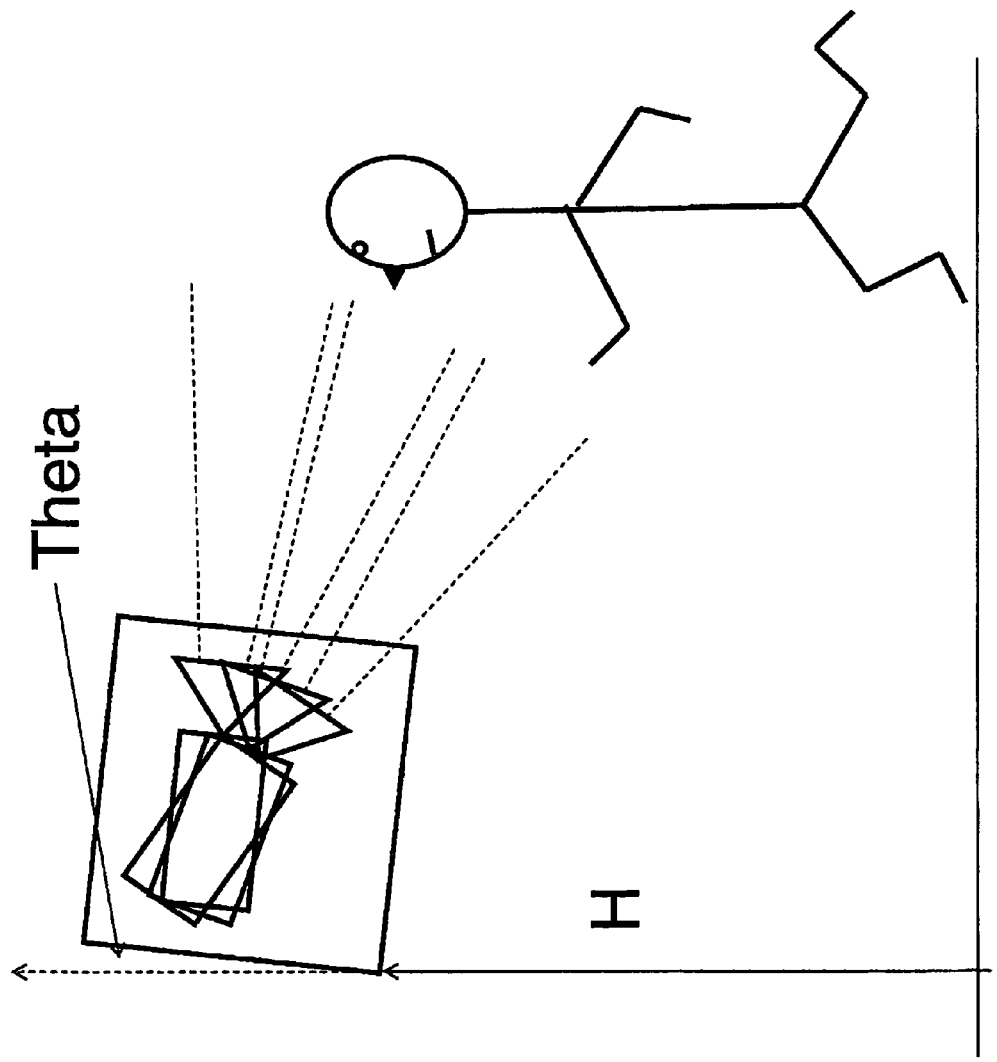
FIG. 4 shows a profile view of a biometric system mounted above a doorway, showing how the region of interest depends on the height H of the device and the tilt Theta of the device.

FIG. 4 shows a profile view of amount of a biometric system between a ceiling and a doorway. There are two problems with such an installation compared to the installation of a traditional biometric system. First, traditional biometric systems typically have carefully defined specifications that define the precise height that the unit should be mounted above the floor. However, when mounting a system between a ceiling and a doorway, the height of the doorway and the height of the ceiling dictates the vertical positioning, H, of the system, and not the installation manual. Further, the heights of doorways and ceilings vary substantially. This is very problematic since a biometric system designed for a certain vertical region of interest to capture a range of heights will not function properly if mounted at an unspecified height. Further, traditional biometric systems have typically acquired data within a small distance (approximately within 8-12") so that any slight angle, theta, in the pitch of the device does not move the vertical region of interest substantially. However, more recent biometric systems can acquire data many feet away from the device, and therefore any slight angle, theta, in the pitch of the device can move the vertical region of interest substantially. The slight variations in pitch and height of the device depend on the circumstances that arise during actual installation, such as the flexing of the wall mounting points, and therefore cannot be calculated from site survey measurements with sufficient accuracy to allow adjustment at the factory. We have developed a method that allows an unskilled installation technician to adjust a complex biometric system in a very short period of time, thereby minimizing installation time and cost.

Figure 5:
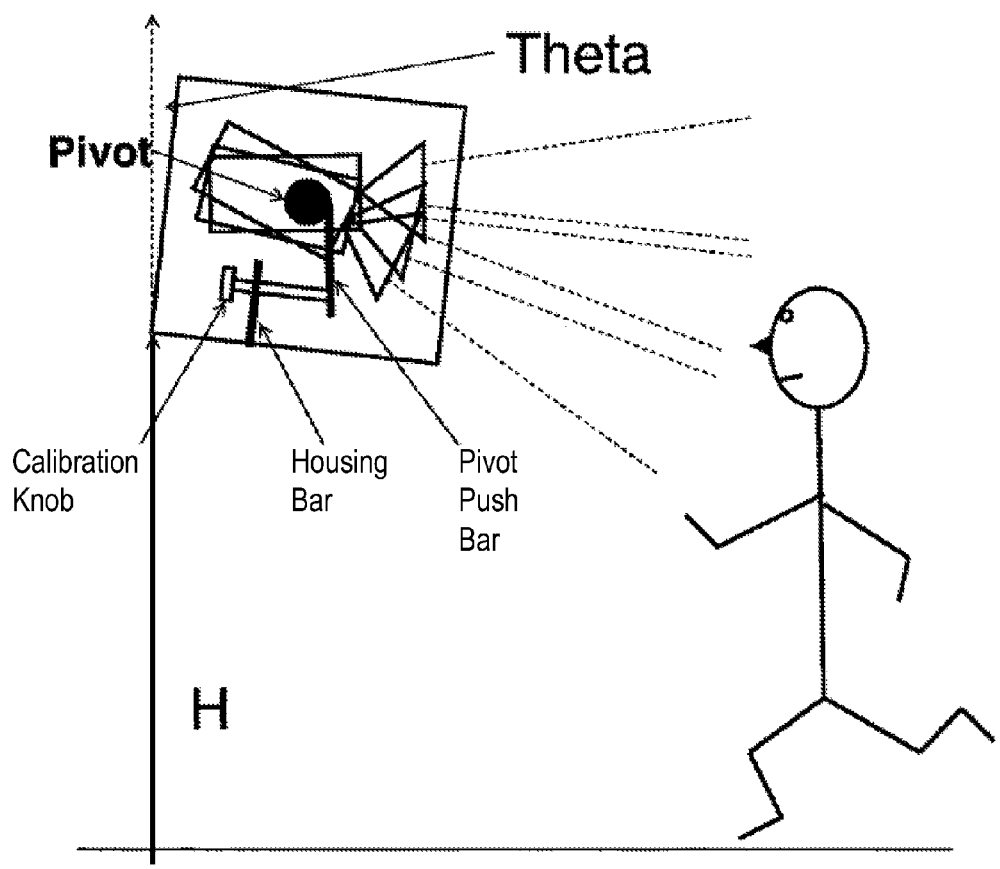
FIG. 5 shows a profile view of a biometric system mounted above a doorway whereby the cameras are mounted on a pivot the angle of which is adjusted by a calibration knob, such that the vertical region of interest of the biometric device can be adjusted on-site depending on deployment-specific constraints on the height and angle of the device.

FIG. 5 shows the solution we have developed. The cameras are all mounted on a single camera module that in turn is mounted on a horizontal pivot. A pivot push bar is attached to the camera module. A housing bar is attached to the case of the biometric system which in turn is attached to the wall or other installation arrangement. A calibration knob comprising a screw thread is screwed through the housing bar and pushes against the pivot push bar. The installation technician installs the biometric unit without having to be concerned substantially with the pitch of the device, and only has to ensure that the device lies within a very broad height range (e.g. 6.5 ft-12 ft) which can be ascertained from inaccurate and rapid site-survey analysis. The installation technician is then able to adjust the precise vertical region of interest by rotating the calibration knob. Rotating the calibration knob during installation pushes the pivot push bar which in turns rotates the camera module within the housing. The installation technician can adjust the knob and then test performance at different heights in the region of interest. The use of the screwed thread as an adjustment mechanism has the benefit of (i) great precision in adjustment with a wide range of travel (ii) allows the operator to make relative adjustments to allow iterative calibration (e.g. turn the knob one revolution, re-test the biometric system, turn the knob a second revolution) without having to perform a difficult and error prone absolute calibration which may require the participation of a second person which increases cost, or requires additional calibration support materials such as target charts carefully positioned, which take time to set up and are error prone.

What is claimed is:

1. A biometric system comprising:
   two or more camera sensors with a physical arrangement that is substantially horizontal, each of the two or more camera sensors monitoring a respective region of interest, the respective regions spatially fixed with respect to one another in a substantially vertical arrangement;
   a camera housing module housing the two or more camera sensors; and
   a biometric housing module comprising a pivot for the camera housing module, and an adjustment mechanism allowing adjustment of a vertical orientation of the camera housing module relative to the biometric housing module at the pivot.

2. The system claim 1, wherein the camera sensors are closely spaced with respect to each other in the substantially horizontal physical arrangement.

3. The system claim 1, further comprising an attention mechanism located substantially close to the two or more camera sensors.

4. The system claim 3, wherein the attention mechanism comprises a video monitor showing imagery of the user.

5. The system of claim 3, wherein the attention mechanism draws a person's gaze towards a direction of the two or more camera sensors.

6. The system of claim 1, wherein the adjustment mechanism comprises a screw-thread mechanism.

7. The system of claim 1, wherein the physical arrangement of the two or more camera sensors are fixed relative to one another.

8. The system of claim 1, wherein the respective regions overlap at least to some extent.

9. The system of claim 1, wherein the pivot comprises a substantially horizontal pivot.

* * * * *